(12) United States Patent
Dahlfort et al.

(10) Patent No.: US 8,616,786 B2
(45) Date of Patent: Dec. 31, 2013

(54) DEVICE, SYSTEM AND METHOD FOR OPTICAL FIBER NETWORKS

(75) Inventors: Stefan Dahlfort, Santa Clara, CA (US); Hans Mickelsson, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 346 days.

(21) Appl. No.: 12/989,680

(22) PCT Filed: Apr. 30, 2008

(86) PCT No.: PCT/EP2008/055319
§ 371 (c)(1),
(2), (4) Date: Jan. 6, 2011

(87) PCT Pub. No.: WO2009/132706
PCT Pub. Date: Nov. 5, 2009

(65) Prior Publication Data
US 2011/0091153 A1   Apr. 21, 2011

(51) Int. Cl.
G02B 6/42   (2006.01)
G02B 6/52   (2006.01)

(52) U.S. Cl.
USPC .............................................. 385/89; 385/134

(58) Field of Classification Search
None
See application file for complete search history.

(56) References Cited

U.S. PATENT DOCUMENTS

| | | | | |
|---|---|---|---|---|
| 4,720,630 A | * | 1/1988 | Takeuchi et al. | 250/551 |
| 4,733,094 A | * | 3/1988 | Carpentier et al. | 250/551 |
| 2003/0123813 A1 | | 7/2003 | Ravasio et al. | |
| 2004/0234270 A1 | * | 11/2004 | Nishie et al. | 398/141 |
| 2006/0093283 A1 | * | 5/2006 | van Haasteren et al. | 385/92 |
| 2007/0053638 A1 | * | 3/2007 | Nishizawa et al. | 385/92 |
| 2007/0154148 A1 | * | 7/2007 | Oen et al. | 385/88 |
| 2008/0013893 A1 | | 1/2008 | Zheng et al. | |

FOREIGN PATENT DOCUMENTS

| | | | |
|---|---|---|---|
| CN | 1417607 A | | 5/2003 |
| JP | 7-168061 A | * | 7/1995 |
| WO | 01/50169 A | | 7/2001 |
| WO | 01/50169 A1 | | 7/2001 |

OTHER PUBLICATIONS

Chinese Office Action, dated Feb. 24, 2012, in connection with counterpart Chinese Application No. 2008/80128957.7 (Foreign Associate provided translation below).

Foreign Associate provided translation of Chinese Office Action, dated Feb. 24, 2012, in connection with counterpart Chinese Application No. 2008/80128957.7.

PCT International Search Report, mailed Jan. 20, 2009, in connection with International Application No. PCT/EP2008/055319.

(Continued)

*Primary Examiner* — Mike Stahl
(74) *Attorney, Agent, or Firm* — Potomac Patent Group PLLC

(57) ABSTRACT

The present invention relates to a device, system and method for construction of and use in optical fiber networks, such as an Air Blown Fiber (ABF) system. An optical device comprising a housing having arranged therein an optical fiber attachment is provided. Further, an optical transceiver having a port adapted for coupling light to/from an optical fiber attached to the optical fiber attachment, and an electrical interface connected to the optical transceiver are arranged in the housing, and the housing has a form factor adapted for air blown fiber systems. Further a method for constructing a fiber network is provided by blowing an optical device through a duct and connecting the optical device to a docking station.

9 Claims, 7 Drawing Sheets

(56) References Cited

OTHER PUBLICATIONS

PCT Written Opinion, mailed Jan. 20, 2009, in connection with International Application No. PCT/EP2008/055319.
International Preliminary Report on Patentability, mailed Jul. 6, 2010, in connection with International Application No. PCT/EP2008/055319.
Quinby, E., Corning: "Air Blown Fiber Systems—A technical Discussion", Jan. 2005.
Ericsson Network Technologies: "Ribbonet System Description. Air Blown Fiber", 28701-2/FBG101254 Uen Rev E Dec. 20, 2006.
Griffioen, W. et al. "Experience in Sweden with preferrulized cables blown to homes through 4/3 mm micro-ducts", pp. 41-48, NOC/OC &I'2007. Reproduced in 2009 Compilation As Griffioen, W. et al. "Preferrulized Cables for Blowing to Homes through 4/3 mm Microducts" Transactions of the IWCS, vol. 2, pp. 80-07, 2009.
Wahllof, H. et al. "Silicon modules increase system efficiency", 12th International Electronic Manufacturing Technology Symposium, IMET 1992, pp. 321-327.

* cited by examiner

DEVICE, SYSTEM AND METHOD FOR OPTICAL FIBER NETWORKS

TECHNICAL FIELD

The present invention relates to a device and method for use in optical fiber networks, such as an Air Blown Fiber (ABF) system. In particular, the present invention is suited for networks implementing Fiber To The x (FTTx), such as Fiber To The Home (FFTH), Fiber To The Curb (FTTC), Fiber To The Desk (FTTD) and the like.

BACKGROUND

Fiber-optic communication networks are currently at an increasing pace reaching closer to the end-users in order to meet the continuously growing demand for bandwidth. Ultimately, these optical networks reach all the way to the subscriber, i.e. Fiber To The Home (FTTH). Compared to networks already reaching the subscribers, such as telephony copper-pairs and cable-TV coax cables, introducing a new network is very costly. The costs related to FTTH arise from the active equipment, especially the optical components, and to a larger extent from the installation of the fiber network all the way to the subscriber.

In an attempt to lower the equipment cost, FTTH technology has been standardized in FSAN and ITU-T as GPON (see ITU-T G.984.1-5 Gigabit-capable Passive Optical Network (GPON)) and in IEEE as EFM (see IEEE 802.3ah, Ethernet in the First Mile (EFM). As regards the costly optical components, the costs have certainly been lowered with the higher volumes resulting from standardization but the components as such has not evolved in any fundamental way over the last 10 years. The optical sub-systems, such as the optical transceivers, are still made from rather bulky discrete components.

The installation costs are a main factor in the construction of a FTTH network. In order to lower the installation costs, the concept of Air Blown Fiber (ABF) and especially when it is performed by a single person, has been introduced (see e.g. Eric Quinby, Corning: "Air Blown Fiber Systems—A technical Discussion", January 2005 and Ericsson Network Technologies: "Ribbonet System Description. Air Blown Fiber", 28701-2/FBG101254 Uen Rev E 2006 Dec. 20). At present, micro-duct tubes are installed to the subscriber which is much less costly, error-prone and cause of fiber breaks. The fiber is subsequently blown by air-pressure through the micro-ducts. The conventional way in ABF is to blow fibers with optical connectors from the subscriber to a fiber concentration point (FCP). The FCP may in ISO/IEC 11801 terms be the building distributor (BD) or campus distributor (CD) points (see e.g. Ericsson Network Technologies: "Ribbonet System Description. Air Blown Fiber", 28701-2/FBG101254 Uen Rev E 2006 Dec. 20 for system architectures of ABF systems).

Using fibers with prefabricated connectors lowers the cost of connecting the fibers in the field as it can be much more efficiently done at the factory site. However, to lower the time of the fiber blowing personnel being at and travelling in between subscriber premises, the concept of blowing a preferrulized fiber to the subscriber from the FCP has been proposed (see e.g. W. Griffioen, et al.: "Experience in Sweden with preferrulized cables blown to homes through ⅘ mm micro-ducts", pp 41-48, NOC/OC&I'2007).

SUMMARY

In view of the above, it is an object of the present invention to reduce the costs related to construction of a fiber network.

Accordingly, an optical device is provided. The optical device comprises a housing having arranged therein an optical fiber attachment. An optical transceiver is arranged in the housing, the optical transceiver having a port adapted for coupling light to/from an optical fiber attached to the optical fiber attachment. Further, an electrical interface connected to the optical transceiver is arranged in the housing that has a form factor adapted for air blown fiber systems.

Furthermore, an optical system comprising an optical device as described herein is provided. The optical system comprises an optical fiber having a first end coupled to the optical fiber attachment.

It is an important advantage of the present invention that a person without specific training, e.g. a subscriber, can install an optical network termination node by simple error safe coupling of electrical connectors. No optical connections requiring specially trained personnel have to be made at the subscriber leading to tremendous savings in installation costs.

In accordance with a further aspect of the invention, a method for constructing a fiber network is provided. The method comprises providing an optical device at an end of an optical fiber. The optical device comprises a housing having arranged therein an optical fiber attachment, an optical transceiver having a port adapted for coupling light to/from an optical fiber attached to the optical fiber attachment, and an electrical interface connected to the optical transceiver. The housing has a form factor suitable for air blown fiber systems. Further, the method comprises blowing the first end of the optical fiber with the optical device from a first point to a second point through a duct. The electrical interface of the optical device is then connected to a docking device at the second point.

It is an advantage of the present invention that the need for optical connectors is eliminated at the subscriber side, which optical connectors in addition to representing a major hardware cost also constitute a frequent source of errors due to dust and other types of contamination.

It is believed that the use of a small optical package pushes and promotes the development of higher integration of optical components, which naturally leads to lower costs.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

ABBREVIATIONS

Figure 1:
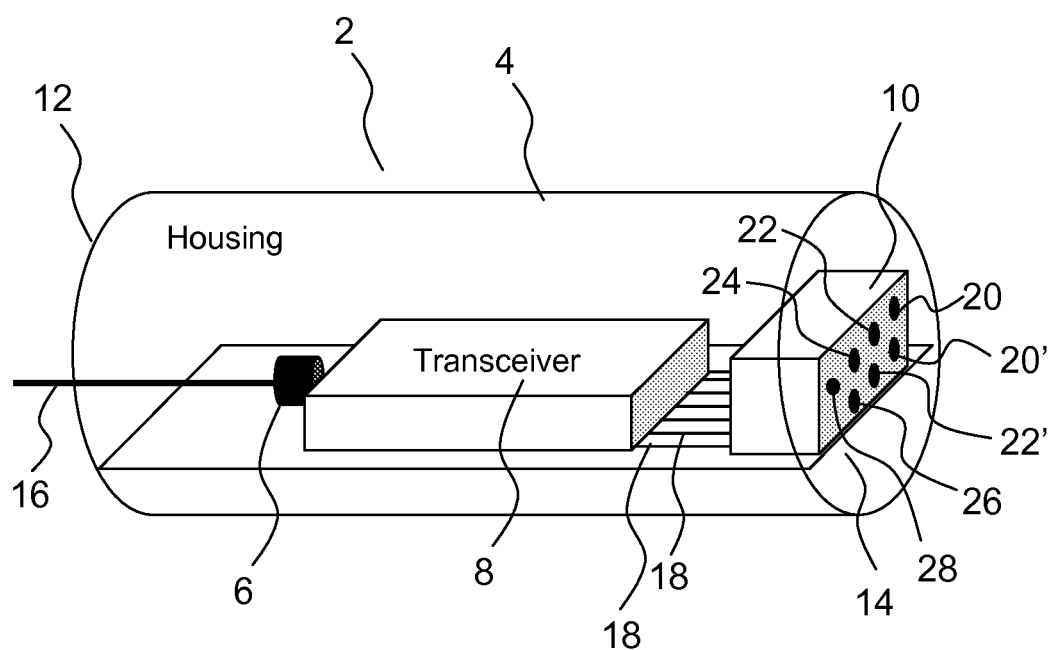
FIG. 1 schematically illustrates an embodiment of the device and system according to the invention, FIG. 2 schematically illustrates an embodiment of the device and system according to the invention, FIG. 3 schematically illustrates an embodiment of an optical transmitter, FIG. 4 schematically illustrates an embodiment of an optical detector, FIG. 5 schematically illustrates a system according to the present invention.

A list of abbreviations and expressions employed herein is found below:
ABF Air Blown Fiber (system)
APD Avalanche Photo Diode (detector)
EFM Ethernet First Mile, IEEE 802.3ah
FCP Fiber Concentration Point
DFB Distributed FeedBack (laser)
GPON Gigabit-capable PON, ITU-T G.984.1-5
HPON Hybrid PON
ONT Optical Network Termination
ONU Optical Network Unit
PIN Positive-Intrinsic-Negative (detector)
PON Passive Optical Network
Rx Receiver
Serdes Serializer/DeSerializer
SFF Small Form Factor
TDM Time Division Multiplexing
TIA TransImpedance Amplifier
Tx Transmitter
VCSEL Vertical Cavity Surface Emitting Laser
WDM Wavelength Division Multiplexing

DETAILED DESCRIPTION

The figures are schematic and simplified for clarity, and they merely show details which are essential to the understanding of the invention, while other details have been left out. Throughout, the same reference numerals are used for identical or corresponding parts.

In the present context, form factor relates to the physical size and shape of a member, such as a housing.

The optical device according to the invention is in particular useful in air blown fiber systems, however it is likely that a wide range of fiber optic communication systems and/or networks will benefit from a very small integrated optical transceiver with attached fiber. One example would be optical interconnect of large high-speed tele/datacom equipments.

Preferably, the housing of the optical device is a tubular housing. The housing may have a diameter less than 6 mm, e.g. about 5 mm. In an embodiment, the housing may have a diameter less than 3.5 mm, such as in the range from about 0.5 mm to about 3.3 mm. e.g. about 3 mm. The optical device has a form factor which makes it suitable for air blown systems thereby enabling distribution of a fiber having active optical components attached at the end through a duct, e.g. a microduct and/or a multiduct.

The housing may extend along a central first axis from a first, or proximal, end to a second, or distal, end. The size and shape of cross sections perpendicular to the first axis may vary along the first axis.

Typically, a micro-duct for ABF systems has an internal diameter of 6 mm or 3.5 mm. Accordingly, in order to be able to blow the optical device through the duct, cross sections of the housing may have a maximum width less than the internal diameter of the duct, e.g. less than 6 mm for a micro-duct having internal diameter of 6 mm, and less than 3.5 mm for a micro-duct having internal diameter of 3.5 mm, such as less than 3.3 mm, preferably less than 3 mm.

In an embodiment of the optical device, the cross sections of the housing may have a maximum width in the range from about 2 mm to about 6 mm, e.g. in the range from about 2 mm to about 5 mm.

In an embodiment, the housing has a largest diameter less than 6 mm. In an embodiment, the housing has a largest diameter less than 3.5 mm. The housing may have a largest diameter in the range from about 0.5 mm to about 3.3 mm.

The housing may comprise at least one engagement member for attaching, e.g. removably attaching, a blowing tip to the optical device. The engagement members may comprise one or more recesses formed in the outer surface of the housing. Alternatively, or in combination, the one or more engagement members may comprise one or more protrusions on the outer surface of the housing.

The first end may form a supporting edge or surface for a blowing tip.

The housing may comprise at least one locking member for locking, e.g. releasably locking, the optical device to a docking station. The locking members may comprise one or more recesses formed in the outer surface of the housing. Alternatively, or in combination, the one or more locking members may comprise one or more protrusions on the outer surface of the housing.

The housing may be made of a plastic material, e.g. a plastic material suitable for moulding such as various combinations of nylon and/or liquid crystal plastic. In an embodiment, carbon may be added to the plastic material.

In an embodiment of the present invention, the housing may be formed such that a part of the housing constitutes or incorporates a blowing tip.

A fiber port may be arranged in the first end surface of the housing. An optical fiber enters the housing through the fiber port and is attached at the optical fiber attachment. Preferably, the fiber port seals the housing in such a way that dust and other disturbing elements are prevented from entering the housing.

The optical components of the optical device may be hermetically sealed, e.g. by using the globe-top technology (see for example Wahllof, H.; Nilsson, A: "Silicon modules increase system efficiency", 12th International Electronic Manufacturing Technology Symposium, IEMT 1992, pages: 321-327).

The housing may comprise on or more metal components, e.g. in order to increase mechanical strength and/or for enabling magnetic coupling of the optical device to a docking device at the subscriber.

The optical transceiver may comprise an optical transmitter connected to the electrical interface. Preferably, the optical transmitter comprises a laser, such as a distributed feedback laser, a vertical cavity surface emitting laser (VCSEL), a Fabry Perot laser, and the like. Further, the optical transmitter may comprise a laser driver for driving the laser in accordance with electrical signals from the electrical interface.

Preferably, the optical transceiver comprises an optical receiver connected to the electrical interface. The optical receiver comprises a detector, such as a Positive-Intrinsic-Negative (PIN) detector and/or an Avalanche Photo Diode (APD) detector, and/or other receiver components such as one or more amplifiers including a transimpedance amplifier (TIA) and/or a limiting amplifier.

Furthermore, the optical transceiver may comprise a filter adapted for coupling light from the optical transmitter to an optical fiber attached to the optical fiber attachment. Furthermore, the filter may be adapted for coupling light from the optical fiber attached to the optical fiber attachment to the optical receiver. The filter may be an optical diplexer filter for separating the ingoing and outgoing optical signal.

The electrical interface may comprise a number of ports or pins for coupling electrical signals to or from the optical device by connection to corresponding ports/pins of a docking device. The electrical interface may comprise a first and second input port for receipt of electrical data signals and/or a first and second output port for transmission of electrical data signals. Alternatively, or in combination, the electrical interface may comprise a power port for supply of power to the optical device. In order to be able to control the optical device, the electrical interface may comprise a control port for control signals to/from the optical device (serial low-speed control and monitor signaling, e.g. temperature, laser bias, laser on/off, power levels, etc). The electrical interface may comprise a ground port.

As mentioned above, an optical system is provided. The optical system may in addition to the optical device and the optical fiber comprise an optical network termination device comprising a first electrical interface for connection to the electrical interface of the optical device.

It is an important advantage of the device and system that the optical part of an optical network termination node is arranged in a housing and connected to the remaining part of the network termination node in an electrical coupling, thereby enabling error proof installation by an ordinary user, i.e. without need for specially trained personnel.

The optical system may comprise a docking device comprising a first interface for connection to the electrical interface of the optical device. The first interface may comprise a connector of any suitable type, e.g. a male type connector or a female type connector, or a combination thereof. Preferably, the docking device comprises a second interface for connection to an optical network termination device. The second interface may comprise one or more connectors, such as a first connector for provision of power and/or a second connector for provision of data signals and/or control signals to the optical device from an optical network termination device.

FIG. 1 schematically illustrates an embodiment of the optical device and the optical system according to the invention. The optical device 2 comprises a housing 4 having arranged therein an optical fiber attachment 6, an optical transceiver 8 having a port adapted for coupling light to/from an optical fiber attached to the optical fiber attachment 6, and an electrical interface 10 connected to the optical transceiver. The housing 4 has a form factor adapted for air blown fiber systems, i.e. the physical size and shape of the housing are such that the optical device is adapted for being blown through a duct in an air blown fiber system. The housing 4 extends along a central first axis from a first, or proximal, end 12 to a second, or distal, end 14. Preferably, the housing 4, as illustrated in FIG. 1, is substantially tubular with a circular cross section perpendicular to the first axis. The housing 4 has a diameter in the order of 3 mm and a length in the order of 5 mm. The size and shape of cross sections perpendicular to the first axis may vary along the first axis.

An optical fiber 16 is attached to the optical fiber attachment 6 such that light during use is coupled from the optical fiber 16 to the optical transceiver 8 and vice versa.

Preferably, the electrical interface is arranged at the second end of the housing. In the embodiment illustrated in FIG. 1, the electrical interface 10 comprises a number of ports for coupling electrical signals to or from the optical device via electrical connections 18 between the electrical interface and the optical transceiver 8, including a first and second input port 20, 20' for receipt of electrical data signals and a first and second output port 22, 22' for transmission of electrical data signals. Further, the electrical interface 10 comprises a power port 24 for supply of power to the optical device and optionally a ground port 26 for ground. In order to be able to control the optical device, the electrical interface 10 may comprise one or more control ports 28 for control signals either serially or in parallel to/from the optical device.

Figure 2:
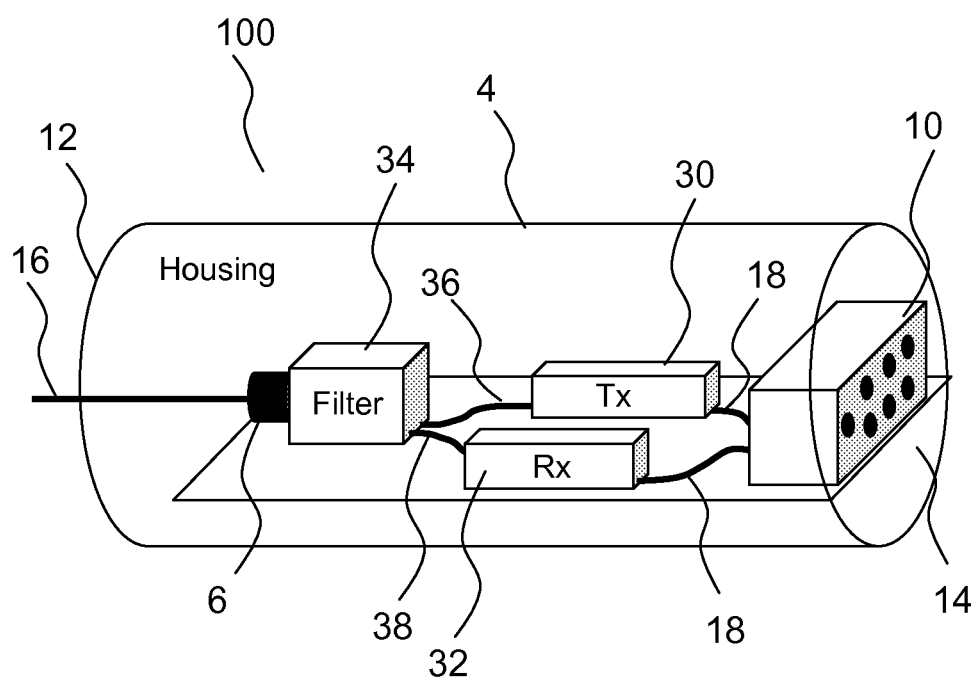

The ports for coupling electrical signals to and/or from the optical device may be arranged in any suitable configuration. The electrical interface may be adapted to receive one or more connector pins of a first interface in a docking station. The electrical interface may be arranged as a female type connector as illustrated in FIG. 1 and FIG. 2, a male type connector or a combination. Preferably, the electrical interface is arranged as a female type connector to protect the electrical interface during installation.

FIG. 2 schematically illustrates an embodiment of the optical device and optical system according to the invention. The optical device 100 has an optical transceiver comprising an optical transmitter 30 connected to the electrical interface 10 by electrical connection 18. Furthermore, the optical transceiver comprises an optical receiver 32 connected to the electrical interface 10 by electrical connection 18. Additionally, the optical transceiver comprises a filter 34 adapted for coupling light from the optical transmitter 30 via optical path 36 to an optical fiber 16 attached to the optical fiber attachment 6. Furthermore, the filter is adapted for coupling light from the optical fiber 16 attached to the optical fiber attachment 6 to the optical receiver 32 via optical path 38. The filter may be an optical diplexer filter for separating the ingoing and outgoing optical signal.

Figure 3:
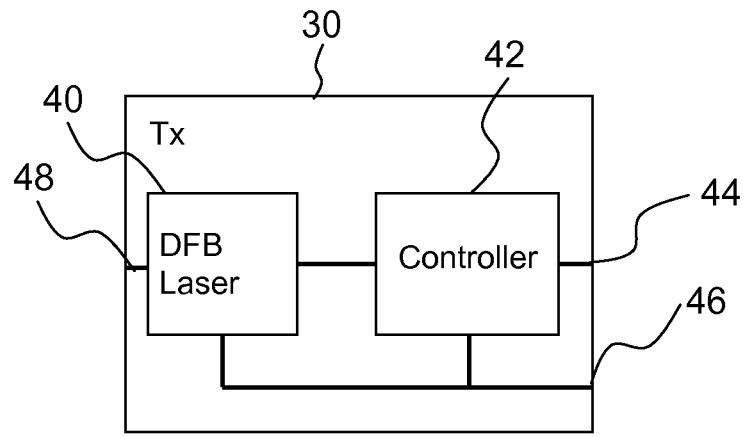

FIG. 3 schematically illustrates an embodiment of the optical transmitter 30 in FIG. 2. The optical transmitter 30 comprises a distributed feedback laser 40 that is connected to a controller or laser driver 42 for driving the DFB laser 40 in accordance with electrical signals on the input port 44 from the electrical interface 10. The electrical signals on input port 44 may include data signals and/or control/monitor signals. The laser 40 and the controller 42 are fed with power on the power port 46. The laser 40 delivers an optical output signal to the output port 48 of the optical transmitter.

Figure 4:
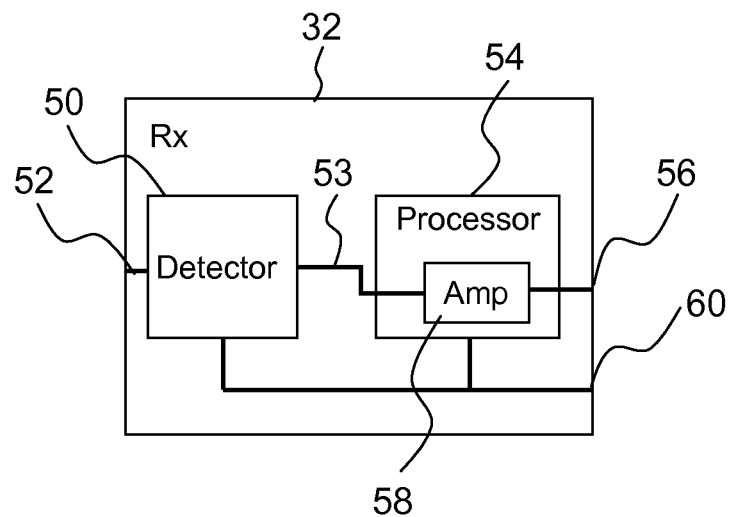

FIG. 4 schematically illustrates an embodiment of the optical receiver 32 in FIG. 2. The optical receiver 32 comprises a PIN detector 50 that is adapted to transform an optical signal on the input port 52 to an electrical signal that is fed via electrical connection 53 to a signal processing unit 54 that is adapted to process the electrical signal from the detector 50 and forward the processed signal to the output port 56 of the receiver 32. The processing unit 54 comprises one or more amplifiers 58, e.g. a transimpedance amplifier. The detector 50 and the other receiver components 54, 58 are fed with power on the power port 60.

Figure 5:
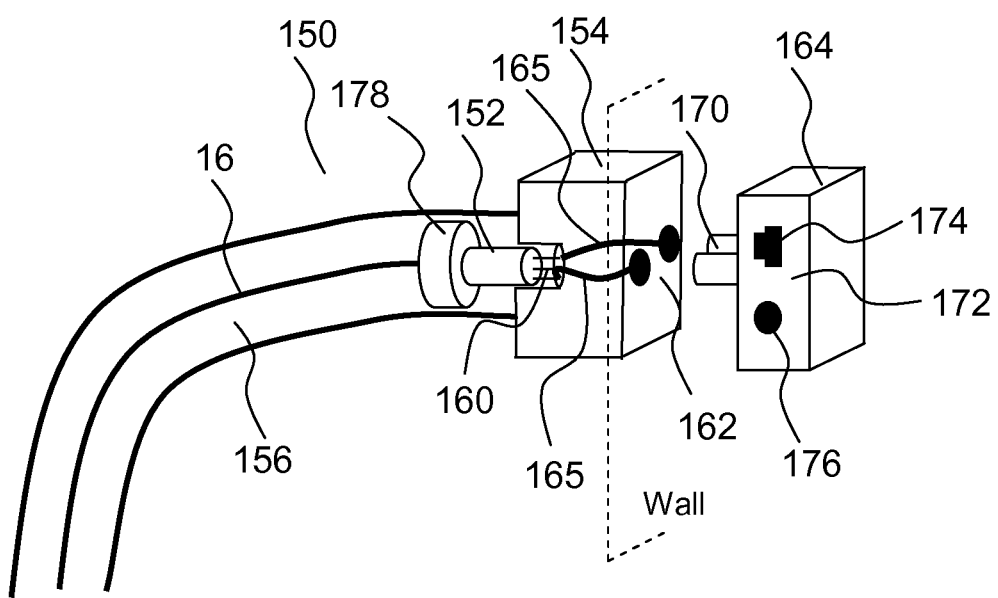

FIG. 5 schematically illustrates an optical system according to the present invention. The optical system 150 comprises an optical device 152, e.g. an optical device 2, 100 as described in connection with FIGS. 1 and 2, and an optical fiber 16 having a first end attached to the optical fiber attachment of the optical device such that light from the optical fiber 16 is coupled to the optical device 152. The connection between the optical fiber 16 and the optical device 152 may be sealed to protect the optical components from contamination, such as dust, moisture, and the like. Further, the optical system 150 comprises a docking device 154 adapted for receipt of and connection to the optical device 152 at the subscriber, when the optical device 152 and the fiber 16 is blown through the duct, here a micro-duct 156. The docking device 154 comprises a first interface 160 for connection to the electrical interface of the optical device 152, and a second interface 162 for connection to an optical network termination device 164. The first interface 160 and/or the second interface 162 comprises one or more connectors for forming electrical connections to the optical device 152 and the optical network termination device 164, respectively. The first interface 160 is connected to the second interface 162 by electrical connections 165. The optical network termination device 164 comprises a first interface 170 including one or more connectors for forming electrical connection with the docking device and the optical device. In an embodiment, the docking device may comprise optical network termination functionality. Furthermore, the optical network termination device 164 comprises a second interface 172 including one or more connectors, e.g. a data connector 174, such as but not limited to RJ45, and/or a power connector 176, for connection to network equipment, e.g. routers, switches and the like, and/or user equipment, such as a computer, router or other terminals.

In an embodiment of the system, the optical network termination device and the docking device may form an integrated unit.

A blowing tip 178 surrounds the optical fiber 16 and supports on the first end surface of the optical device. The blowing tip may comprise engagement members for engagement with corresponding engagement members of the optical device for attaching, e.g. removably attaching, the blowing tip to the optical device.

Figure 6:
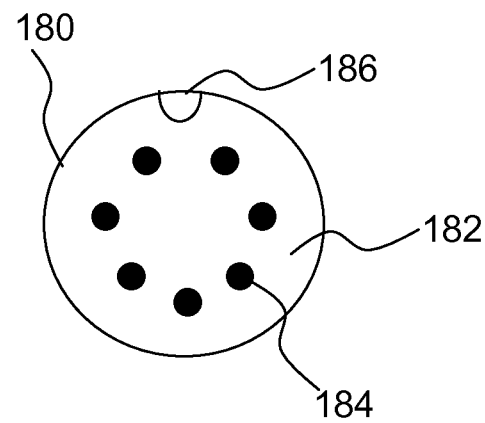
FIG. 6 is an end view of an embodiment of the optical device according to the invention, FIG. 7 schematically illustrates an embodiment of the device and system according to the invention, FIG. 8 schematically illustrates an embodiment of the device and system according to the invention.

FIG. 6 is an end view of an exemplary embodiment of the optical device according to the invention. The optical device 180 has an electrical interface formed in the second end surface 182. The electrical interface comprises a number of ports 184 (seven) that are arranged in a circular configuration for receiving male type connector pins of the first interface of a docking station. A guiding recess 186 may be formed longitudinally in the housing for ensuring correct connection of the optical device and the docking station.

Figure 7:
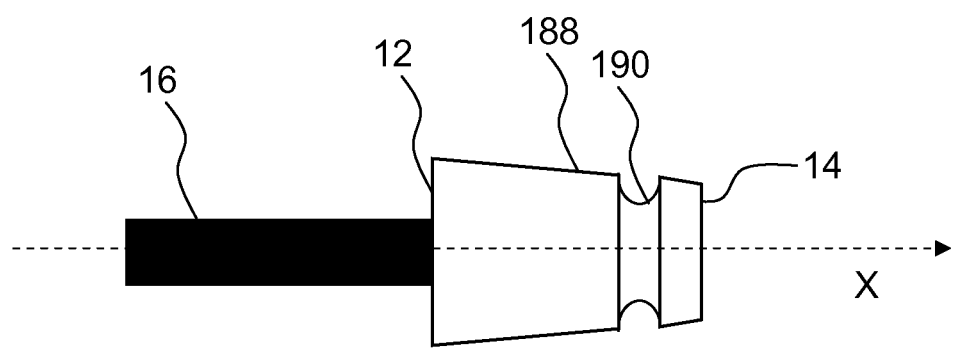

FIG. 7 is a side view of an exemplary housing of an optical device according to the invention. The housing 188 extends along a central first axis X from a first, or proximal, end 12 to a second, or distal, end 14. The housing has a circular cross-section and is tapered. In the illustrated embodiment, the housing diameter at the first end 12 is about 3.3 mm and about 2.5 mm at the second end 14. In an embodiment, the second end 14 has the largest diameter. The housing 188 comprises a locking member 190 formed as an annular recess perpendicular to the first axis.

Figure 8:
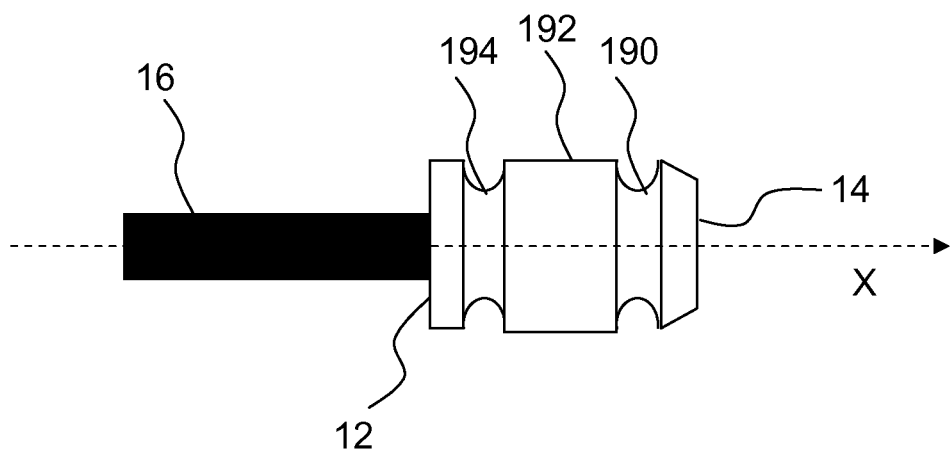

FIG. 8 is a side view of an exemplary housing of an optical device according to the invention. The housing 192 extends along a central first axis X from a first, or proximal, end 12 to a second, or distal, end 14. The housing 192 is tubular with a circular cross-section. In the illustrated embodiment, the housing diameter is about 3 mm; however other diameters such as 5 mm may be employed for micro-ducts having diameters larger than 5 mm e.g. 6 mm. The housing 192 comprises an engagement member 194 for attaching, e.g. removably attaching, a blowing tip to the optical device. It is an advantage that blowing tips of different sizes may be employed enabling flexible use of the optical device and system according to the invention, e.g. for differently sized micro-ducts. The engagement member is provided as an annular recess perpendicular to the first axis. Further the housing 192 comprises a locking member 190 formed as an annular recess perpendicular to the first axis near the distal end 14.

Figure 9:
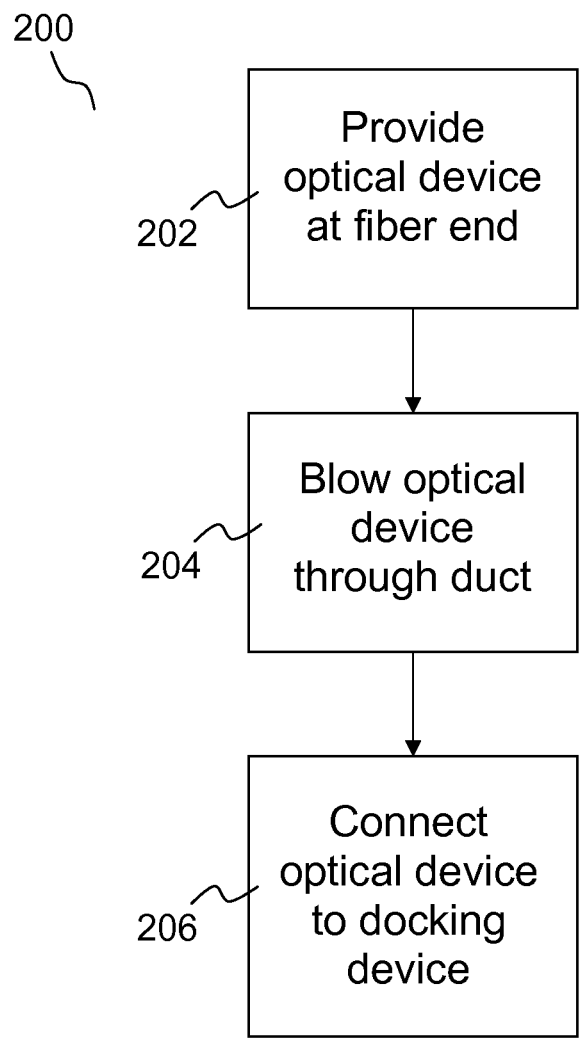
FIG. 9 is a flow chart of an embodiment of the method according to the present invention

FIG. 9 illustrates an embodiment of the method for constructing a fiber network according to the invention. The method 200 comprises the step 202 of providing an optical device at an end of an optical fiber. The optical device comprises a housing having arranged therein an optical fiber attachment, an optical transceiver having a port adapted for coupling light to/from an optical fiber attached to the optical fiber attachment, and an electrical interface connected to the optical transceiver. The housing has a form factor suitable for air blown fiber systems, e.g. a form factor suitable for air blowing through micro-ducts having inner diameter less than 7 mm, such as 3.5 mm or 6 mm. The optical device may be an optical device as described herein, e.g. with reference to the embodiments of the figures. Furthermore, the method 200 comprises the step 204 of blowing the first end of the optical fiber with the optical device from a first point to or towards a second point through a duct. Upon blowing the optical device through the duct, the method 200 proceeds to step 206 of connecting the electrical interface of the optical device to a docking device at the second point. The first point may be a fiber concentration point (FCP), such as a floor distributor (FD), a building distributor (BD) or campus distributor (CD) as denoted in ISO/IEC 11801. The second point may be the optical network termination node at the subscriber. A Transition Outlet (TO) as denoted in ISO/IEC 11801 may constitute the second point.

It is an important advantage that the device, system and method enable WDM in the access (WDM-PON, for example stacked GPONs with CWDM) using a distributed feedback (DFB) laser, since the logistics problem is now reduced: the ONTs can now all be identical and the wavelength specific component is chosen and controlled from a centralized location upon installation.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art.

The invention claimed is:

1. Optical device comprising a housing having arranged therein an optical fiber attachment, an optical transceiver having a port adapted for coupling light to/from an optical fiber attached to the optical fiber attachment, and an electrical interface connected to the optical transceiver, wherein the housing is a tubular housing with a circular cross-section that has a physical size adapted for air blown fiber systems, and wherein said electrical interface comprises electrical connectors adapted for simple and errors safe coupling,
wherein the housing has a largest diameter less than 6 mm.

2. Optical device according to claim 1, wherein the housing has a largest diameter less than 3.5 mm.

3. Optical device according to claim 1, wherein the housing has a largest diameter in the range from about 0.5 mm to about 3.3 mm.

4. Optical device comprising a housing having arranged therein an optical fiber attachment, an optical transceiver having a port adapted for coupling light to/from an optical fiber attached to the optical fiber attachment, and an electrical interface connected to the optical transceiver, wherein the housing is a tubular housing with a circular cross-section that has a physical size adapted for air blown fiber systems, and wherein said electrical interface comprises electrical connectors adapted for simple and errors safe coupling,
wherein the optical transceiver comprises an optical transmitter and an optical receiver connected to the electrical interface, and a filter adapted for coupling light from the optical transmitter to the optical fiber attached to the optical fiber attachment and adapted for coupling light from the optical fiber attached to the optical fiber attachment to the optical receiver.

5. Optical device comprising a housing having arranged therein an optical fiber attachment, an optical transceiver having a port adapted for coupling light to/from an optical fiber attached to the optical fiber attachment, and an electrical interface connected to the optical transceiver, wherein the housing is a tubular housing with a circular cross-section that has a physical size adapted for air blown fiber systems, and wherein said electrical interface comprises electrical connectors adapted for simple and errors safe coupling, wherein the electrical interface comprises a control port for control signals to/from the optical device.

6. Optical device comprising a housing having arranged therein an optical fiber attachment, an optical transceiver having a port adapted for coupling light to/from an optical fiber attached to the optical fiber attachment, and an electrical interface connected to the optical transceiver, wherein the housing is a tubular housing with a circular cross-section that has a physical size adapted for air blown fiber systems, and wherein said electrical interface comprises electrical connectors adapted for simple and errors safe coupling, wherein the housing comprises at least one engagement member for attaching a blowing tip to the optical device.

7. Optical device comprising a housing having arranged therein an optical fiber attachment, an optical transceiver having a port adapted for coupling light to/from an optical fiber attached to the optical fiber attachment, and an electrical interface connected to the optical transceiver, wherein the housing is a tubular housing with a circular cross-section that has a physical size adapted for air blown fiber systems, and wherein said electrical interface comprises electrical connectors adapted for simple and errors safe coupling, wherein the housing comprises at least one locking member for locking the optical device to a docking station.

8. Optical device comprising a housing having arranged therein an optical fiber attachment, an optical transceiver having a port adapted for coupling light to/from an optical fiber attached to the optical fiber attachment, and an electrical interface connected to the optical transceiver, wherein the housing is a tubular housing with a circular cross-section that has a physical size adapted for air blown fiber systems, and wherein said electrical interface comprises electrical connectors adapted for simple and errors safe coupling, further comprising a docking device comprising a first interface for connection to the electrical interface of the optical device, and a second interface for connection to an optical network termination device.

9. A method for constructing a fiber network, wherein the method comprises the steps of:

providing an optical device at an end of an optical fiber, wherein the optical device comprises a housing having arranged therein an optical fiber attachment, an optical transceiver having a port adapted for coupling light to/from an optical fiber attached to the optical fiber attachment, and an electrical interface connected to the optical transceiver, wherein the housing is a tubular housing with a circular cross-section that has a physical size adapted for air blown fiber systems, and wherein said electrical interface comprises electrical connectors adapted for simple and errors safe coupling;

blowing the first end of the optical fiber with the optical device from a first point to a second point through a duct; and connecting the electrical interface of the optical device to a docking device at the second point.

\* \* \* \* \*

UNITED STATES PATENT AND TRADEMARK OFFICE
CERTIFICATE OF CORRECTION

PATENT NO. : 8,616,786 B2
APPLICATION NO. : 12/989680
DATED : December 31, 2013
INVENTOR(S) : Dahlfort et al.

Page 1 of 1

It is certified that error appears in the above-identified patent and that said Letters Patent is hereby corrected as shown below:

In the Specification

In Column 4, Line 40, delete "on or" and insert -- one or --, therefor.

Signed and Sealed this
Twenty-ninth Day of July, 2014

Michelle K. Lee
*Deputy Director of the United States Patent and Trademark Office*